United States Patent
Lewis et al.

(10) Patent No.: US 9,638,051 B2
(45) Date of Patent: May 2, 2017

(54) TURBOMACHINE BUCKET HAVING ANGEL WING FOR DIFFERENTLY SIZED DISCOURAGERS AND RELATED METHODS

(71) Applicant: General Electric Company, Schenectady, NY (US)

(72) Inventors: Gareth William David Lewis, Greenville, SC (US); Andrew Daniel Grafitti, Greenville, SC (US); Jonathan Matthew Lomas, Simpsonville, SC (US); Felipe Roman-Morales, Greenville, SC (US); Ronald Lee Souther, Campobello, SC (US)

(73) Assignee: General Electric Company, Schenectady, NY (US)

( * ) Notice: Subject to any disclaimer, the term of this patent is extended or adjusted under 35 U.S.C. 154(b) by 545 days.

(21) Appl. No.: 14/017,690

(22) Filed: Sep. 4, 2013

(65) Prior Publication Data

US 2015/0064008 A1    Mar. 5, 2015

(51) Int. Cl.

| | |
|---|---|
| *F01D 25/24* | (2006.01) |
| *F04D 3/00* | (2006.01) |
| *F04D 19/00* | (2006.01) |
| *F01D 11/02* | (2006.01) |
| *F01D 5/14* | (2006.01) |
| *B23P 15/04* | (2006.01) |
| *B23P 6/00* | (2006.01) |
| *F01D 5/00* | (2006.01) |

(Continued)

(52) U.S. Cl.
CPC ............. *F01D 11/02* (2013.01); *B23P 6/007* (2013.01); *B23P 15/04* (2013.01); *F01D 5/005* (2013.01); *F01D 5/14* (2013.01); *F01D 5/288* (2013.01); *F01D 11/001* (2013.01); *F05D 2230/80* (2013.01); *Y10T 29/4932* (2015.01)

(58) Field of Classification Search
CPC .. F01D 5/14; F01D 11/02; F05D 11/02; B23P 15/04
USPC ............................ 415/173.7, 174.5; 29/889.2
See application file for complete search history.

(56) References Cited

U.S. PATENT DOCUMENTS

| | | |
|---|---|---|
| 4,611,744 A | 9/1986 | Fraser et al. |
| 6,049,978 A | 4/2000 | Arnold |
| 6,506,016 B1 | 1/2003 | Wang |

(Continued)

FOREIGN PATENT DOCUMENTS

| | | |
|---|---|---|
| EP | 0735240 B1 | 4/2001 |
| EP | 1128024 A2 | 8/2001 |

(Continued)

OTHER PUBLICATIONS

International Search Report and Written Opinion issued in connection with corresponding PCT Application No. PCT/US2014/049549 on Oct. 16, 2014.

*Primary Examiner* — Theresa Trieu
(74) *Attorney, Agent, or Firm* — Ernest G. Cusick; Hoffman Warnick LLC (57) ABSTRACT

A turbomachine bucket may include an airfoil, a shank coupled to the airfoil, and an angel wing coupled to the shank, the angel wing having an axially extending tip sized to seal with a plurality of discouragers, each discourager having a different axial extent. Various methods for modifying an angel wing to accommodate different sized discouragers are also disclosed.

22 Claims, 7 Drawing Sheets (51) Int. Cl.
  *F01D 5/28* (2006.01)
  *F01D 11/00* (2006.01)

(56) References Cited

U.S. PATENT DOCUMENTS

| | | | |
|---|---|---|---|
| 6,532,656 | B1 | 3/2003 | Wilkins et al. |
| 7,234,918 | B2 * | 6/2007 | Brillert ................. F01D 11/001 |
| | | | 415/173.5 |
| 7,465,152 | B2 | 12/2008 | Nigmatulin |
| 7,500,824 | B2 * | 3/2009 | Cheng .................... F01D 11/02 |
| | | | 415/173.4 |
| 8,277,172 | B2 | 10/2012 | Tesh et al. |
| 8,282,346 | B2 | 10/2012 | Deodhar et al. |
| 2006/0133927 | A1 | 6/2006 | Brillert et al. |
| 2006/0134454 | A1 | 6/2006 | Sathian |
| 2006/0207094 | A1 | 9/2006 | Allen et al. |
| 2008/0056889 | A1 | 3/2008 | Cheng et al. |
| 2011/0002777 | A1 | 1/2011 | Smith |
| 2012/0082549 | A1 | 4/2012 | Ellis et al. |
| 2013/0115096 | A1 | 5/2013 | Itzel et al. |
| 2013/0156966 | A1 | 6/2013 | Grohnert et al. |

FOREIGN PATENT DOCUMENTS

| | | |
|---|---|---|
| EP | 1267042 A2 | 12/2002 |
| EP | 1122405 B1 | 12/2010 |
| EP | 2505781 A2 | 1/2012 |
| EP | 2554796 A1 | 2/2013 |
| JP | 2001073706 | 3/2001 |

\* cited by examiner

TURBOMACHINE BUCKET HAVING ANGEL WING FOR DIFFERENTLY SIZED DISCOURAGERS AND RELATED METHODS

BACKGROUND

1. Technical Field

The disclosure relates generally to angel wing seals for turbomachines, and more particularly, to a turbomachine bucket having an angel wing configure to seal with a number of different sized discouragers and related methods.

2. Background Art

The typical design of most turbomachines is known in the art. They include a compressor for compressing air that is mixed with fuel. The fuel-air mixture is ignited in an attached combustor, to generate combustion gases. The hot, pressurized gases are allowed to expand through a turbine nozzle, which directs the flow to turn an attached, high-pressure turbine. The turbine is usually coupled with a rotor shaft, to drive the compressor. The core gases then exit the high pressure turbine, providing energy downstream. The energy is in the form of additional rotational energy extracted by attached, lower pressure turbine stages, and/or in the form of thrust through an exhaust nozzle.

In the typical scenario, thermal energy produced within the combustor is converted into mechanical energy within the turbine, by impinging the hot combustion gases onto one or more bladed rotor assemblies. The rotor assembly usually includes at least one row of circumferentially-spaced rotor blades. Each rotor blade includes an airfoil that includes a pressure side and a suction side. Each airfoil extends radially outward from a rotor blade platform. Each rotor blade also includes a dovetail that extends radially inward from a shank extending between the platform and the dovetail. The dovetail is used to mount the rotor blade within the rotor assembly to a rotor disk or spool.

The rotor forms part of a stator-rotor assembly. The rows of rotor blades on the rotor assembly and the rows of stator vanes on the stator assembly extend alternately across an axially oriented flowpath for 'working' the combustion gases. The jets of hot combustion gas leaving the vanes of the stator element act upon the turbine blades, and cause the turbine wheel to rotate. The element which remains stationary while the turbine rotates at high speed can also be referred to in the art as the nozzle or diaphragm of a turbomachine frame.

An opening at the interface between the stator element and the blades or buckets can allow hot core gas to exit the hot gas path and enter the wheel-space of the turbomachine. In order to limit this leakage of hot gas, the blade structure typically includes axially projecting angel wing seals, also simply referred to as angel wings. According to a typical design, the angel wings cooperate with projecting segments or 'discouragers' which extend from the adjacent stator element, i.e., the nozzle. The angel wings and the discouragers overlap (or nearly overlap), but do not touch each other, thus restricting gas flow.

A gap remains at the interface between adjacent regions of the nozzle and turbine blade, e.g., between the adjacent angel wing-discourager projections, when such a seal is used. The presence of the gap, i.e., clearance, is necessary at the junction of stationary and rotating components to allow for the rotation. However, the gap provides a path which can allow hot core gas to exit the hot gas path into the wheel-space area of the turbomachine. The leakage of hot gas by this pathway is disadvantageous for a number of reasons. First, the loss of hot gas from the working gas stream causes a resultant loss in energy available from the turbomachine. Second, ingestion of the hot gas into turbine wheel-spaces and other cavities can damage components which are not designed for extended exposure to such temperatures, such as the nozzle structure support and the rotor wheel.

Figure 1:
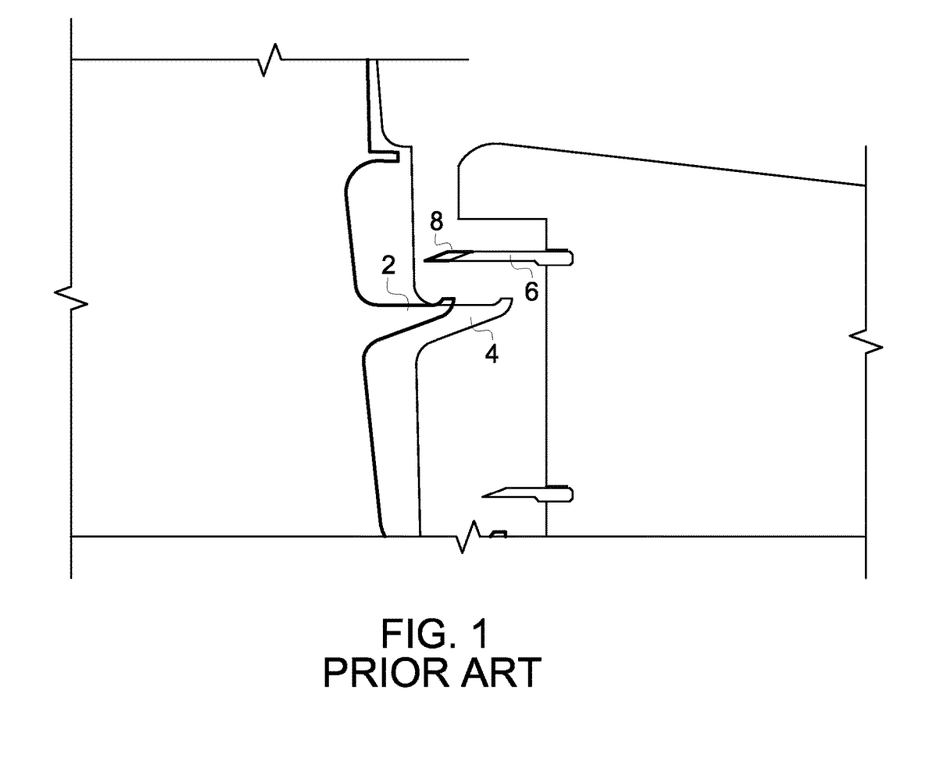
FIG. 1 shows a detailed cross-sectional view of an interposed pair of angel wing-discouragers according to the prior art.

Conventionally most turbomachine blades or buckets, such as those used in gas turbines, are designed for a particular sized discourager of a corresponding turbomachine frame and are not interchangeable for buckets designed for a differently sized discourager due to the different geometries of the frames. For example, FIG. 1 shows two conventional buckets having respective angel wings 2, 4 interposed with two different sized discouragers 6, 8. As illustrated, the two buckets are not interchangeable because of the different angel wings and discouragers. As noted above, different interference fits and/or undesirable cooling performance may be created when an improperly sized bucket is used. For example, where angel wing 2 is used with discourager 6, no overlap would exist; similarly, where angel wing 4 is used with discourage 8, too much overlap may exist. Consequently, new or additional castings must be manufactured in order to generate specific blades or buckets with specifically sized angel wings 2, 4 to be installed in different frames having different sized discouragers 6, 8 to perform with the same design intent.

BRIEF SUMMARY

A first aspect of the disclosure provides a turbomachine bucket comprising: an airfoil; a shank coupled to the airfoil; and an angel wing coupled to the shank, the angel wing having an axially extending tip sized to seal with a plurality of discouragers, each discourager having a different axial extent.

A second aspect of the disclosure provides a method comprising: modifying an axial extent of an axially extending tip of an angel wing of a turbomachine bucket to accommodate sealing with a plurality of discouragers having different axial extents.

A third aspect of the disclosure provides a method comprising: providing a turbomachine bucket having an angel wing having an axially extending tip having a first axial extent sized to seal with a plurality of discouragers having different axial extents; and modifying the first axial extent of the axially extending tip of the angel wing to accommodate a particular discourager having a second, particular axial extent smaller than the first axial extent.

A fourth aspect of the invention relates to a method comprising: removing a turbomachine bucket from a first turbomachine, the bucket having an angel wing sized to seal with a first discourager of the first turbomachine, the first discourager having a first axial extent; modifying an axial extent of an axially extending tip of the angel wing of the turbomachine bucket to configure sealing with a second discourager having a second axial extent different than the first axial extent; and installing the turbomachine bucket in a second turbomachine having the second discourager, the angel wing configured to seal with the second discourager during operation of the second turbomachine.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As indicated above, the disclosure provides a turbomachine bucket and related methods that enable, among other things, a bucket designed for a first turbomachine frame to be installed in a second turbomachine frame while meeting or improving the performance of the original design intent.

Figure 2:
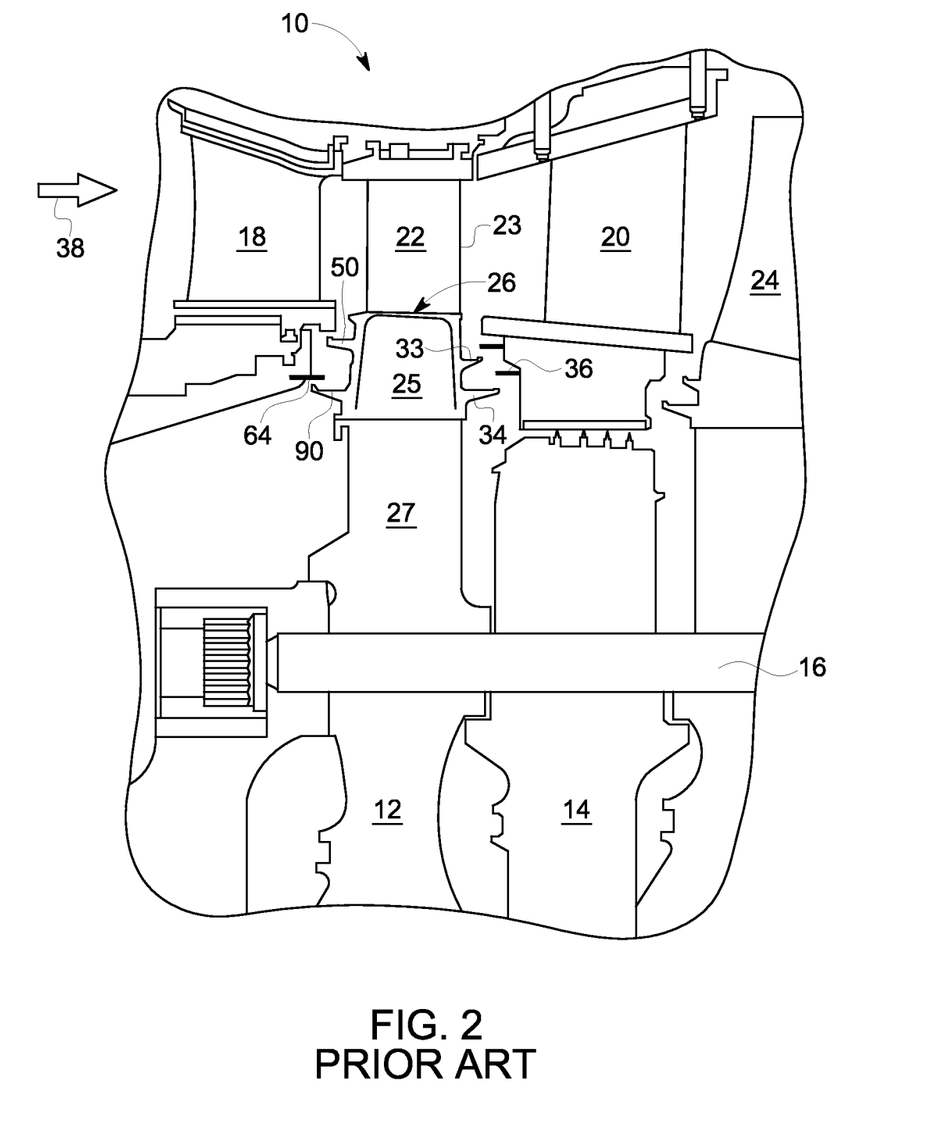
FIG. 2 shows a schematic of a portion of an illustrative turbomachine according to the prior art.

FIG. 2 is a schematic illustration of a section of an illustrative, conventional turbomachine in the form of a gas turbine engine 10. Engine 10 includes axially-spaced rotor wheels 12 and spacers 14, joined to each other by a plurality of circumferentially spaced, axially extending bolts 16. The turbine includes various stages having nozzles, for example, first-stage nozzle 18 and second-stage nozzle 20, comprised of a plurality of circumferentially spaced stator blades. Between the nozzles and rotating with the rotor are a plurality of rotor blades or buckets, the first and second-stage rotor buckets 22 and 24, respectively, being illustrated. Those with knowledge in the art understand that the term 'blades' is usually used for aviation turbines, while the term 'buckets' is typically used when describing the same type of component for land-based turbines. For simplicity, however, the term "bucket" shall be used herein to collectively refer to buckets or blades.

Each bucket, e.g., bucket 22, includes an airfoil 23 mounted on a shank 25, which includes a platform 26. Shank 25 includes a dovetail 27 (not shown in detail), for connection with corresponding dovetail slots formed on rotor wheel 12.

Bucket 22 includes axially projecting angel wings, e.g., 33, 34, 50 and 90. Angel wings are typically integrally cast with the bucket. Angel wings are generally in opposing position to discouragers, e.g., 36 and 64, which protrude from adjacent nozzles 20 and 18, respectively. As one example, discourager 64 is shown in an opposing, overlapping position, relative to angel wing 90. The hot gas path in a turbine of this type is generally indicated by arrow 38. It should be understood that surfaces and other features described in these figures are sometimes referenced in terms of the direction of hot gas flow. For example, the "leading" edge of a feature usually refers to the region that comes into initial contact with the hot gas, while the "trailing" edge refers to a downstream region.

Figure 3:
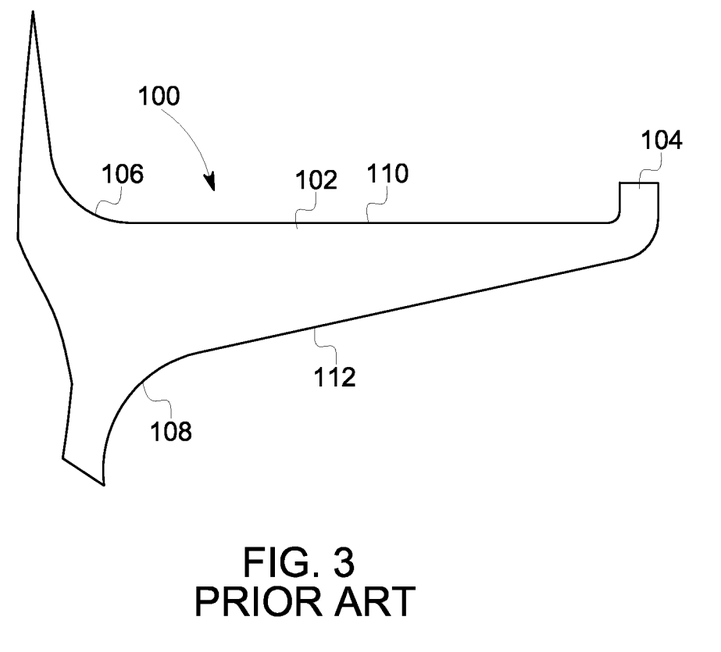
FIG. 3 shows a cross-sectional view of an angel wing according to the prior art.

Referring to FIG. 3, a conventional angel wing 100 may include an angel wing body 102, an upturn or tip 104 at its distal end, upper and lower angel wing root blends 106, 108, respectively, and upper and lower body surfaces 110, 112, respectively. Conventionally, upper and lower surfaces 110, 112 are linear surfaces extending from upper and lower root blends 106, 108, respectively, to tip 104. Upper surface 110 may have an arcuate surface concentric about an axis of rotation of the rotor (not shown).

Figure 4:
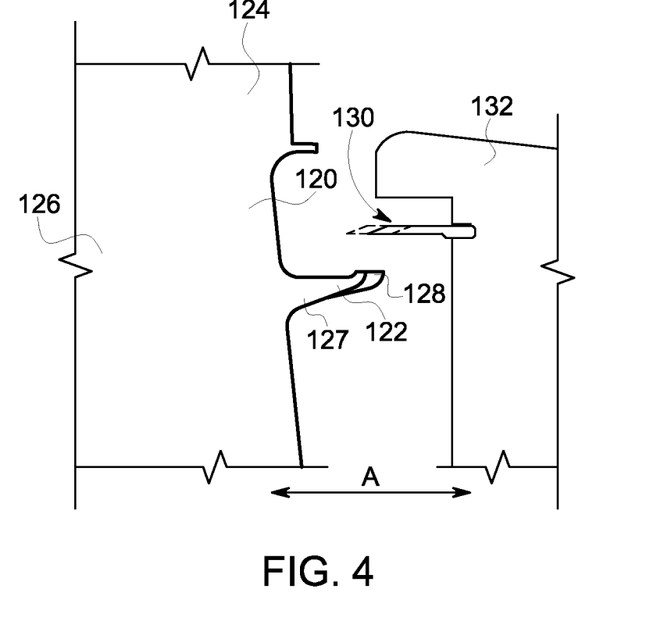
FIG. 4 shows a detailed cross-sectional view of a turbomachine bucket including an angel wing according to embodiments of the invention.

FIG. 4 shows a detailed cross-sectional view of a turbomachine bucket 120 including an angel wing 122 according to embodiments of the invention. Turbomachine bucket 120 may include, among other things, an airfoil 124 and a shank 126 coupled to airfoil 124. Airfoil 124 may take any form appropriate for the particular type of turbomachine in which bucket 120 is used, e.g., jet engine, compressor, gas turbine, steam turbine, etc. Angel wing 122 may be coupled to shank 126 by a base portion 127. In contrast to a conventional angel wing, angel wing 122 has an axially extending tip 128 sized to seal with a plurality of discouragers 130, each discourager having a different axial extent. As used herein, "axial extent" references a length in a direction A of an axis of rotation of turbomachine bucket 120 relative to a point of reference, which for angel wings may be shank 126 and for discouragers may be a turbomachine frame 132 from which they extend. In FIG. 4, a plurality of discouragers 130 having a variety of different sizes, e.g., axial extents from turbomachine frame 132, are illustrated in an overlapping fashion using phantom lines. It is understood that each discourager 130 could have any of the axial extents illustrated or another axial extent, and that each discourager 130 is located in a different turbomachine. Further, each discourager 130 need not be in the same radial position relative to the rotor (not shown). In any event, axially extending tip 128 is configured to seal with discourager 130 extending from turbomachine frame 132, i.e., from one of a nozzle and a diaphragm of the frame. Turbomachine bucket 120 may be made of any now known or later developed material used for the particular type(s) of turbomachines it is used in.

In one embodiment, turbomachine bucket 120 can be created in a fashion to provide axially extending tip 128 configured to seal with differently sized discourager(s) 130, e.g., via casting and any necessary refining machining necessary. According to other embodiments of the invention, an axial extent of an axially extending tip of an angel wing 122 of a turbomachine bucket 120 may be modified, i.e., from an initial state, to accommodate sealing with one or more discouragers 130 having different axial extents.

Figure 5:
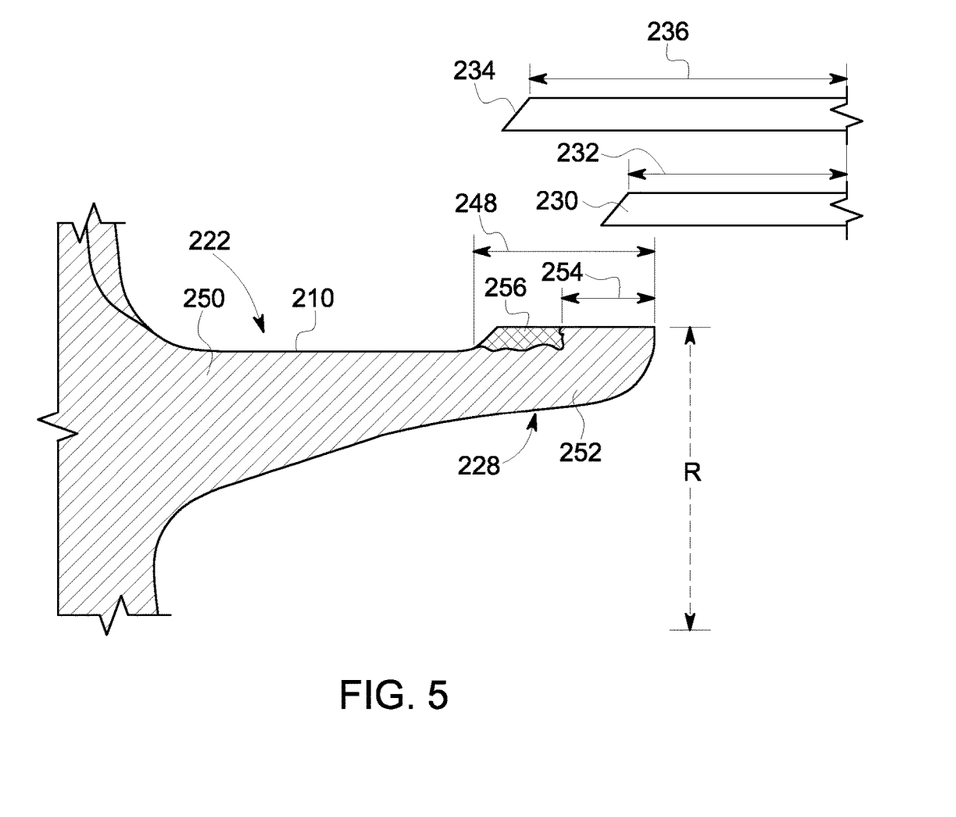
FIG. 5 shows a detailed cross-sectional view of an angel wing according to embodiments of the invention.
Figure 6:
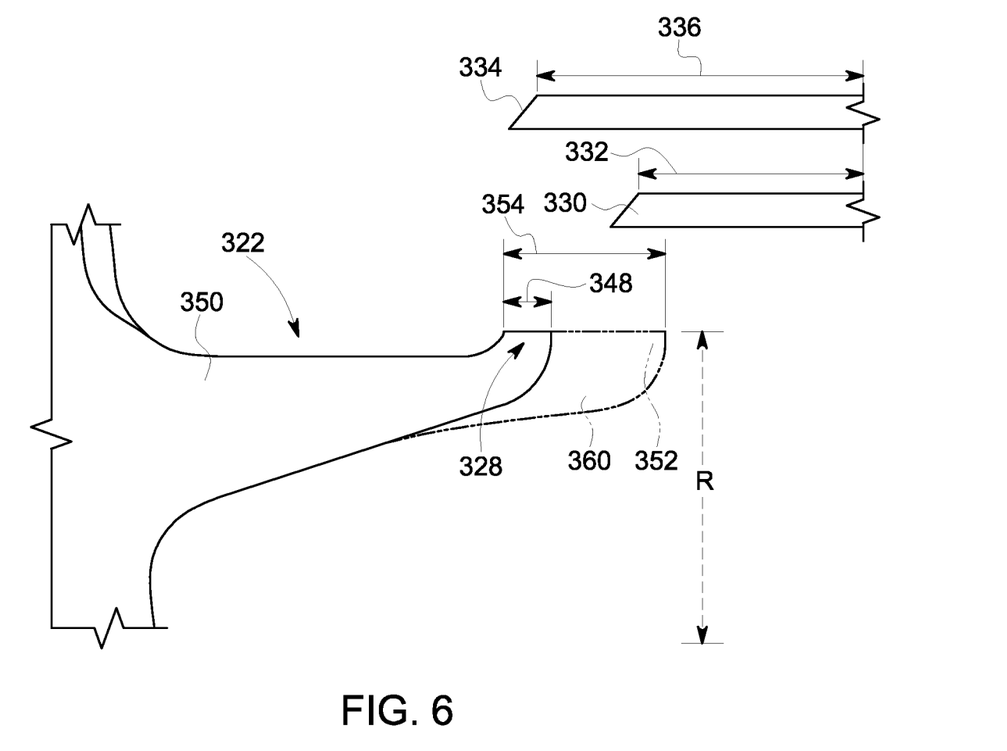
FIG. 6 shows a detailed cross-sectional view of an angel wing according to embodiments of the invention.

FIGS. 5-6 will be used to describe how an angel wing 222, 322 having an axially extending tip 228, 328 having an axial extent 248, 348 configured to seal with different sized discouragers 230, 234, 330, 334 may be provided. In particular, the process may include addition of material to an initial angel wing 250 (FIG. 5) or removal of material from an initial angel wing 350 (FIG. 6). In FIGS. 5 and 6, two discouragers are shown radially situated relative to a single angel wing for comparison purposes; in operation only one discourager would be provided with each angel wing.

FIG. 5 illustrates a process according to embodiments of the invention including addition of material to arrive at a turbomachine bucket 120 (FIG. 4) having angel wing 222 having axially extending tip 228 having an axial extent 248 configured to seal with different sized discouragers 230, 234. In this embodiment, turbomachine bucket 120 (FIG. 4) may be removed from a first turbomachine frame 132 (FIG. 4 only) prior to modifying of an initial angel wing 250. The removal process may use any now known or later developed techniques. The first turbomachine frame may include a discourager 230 having a discourager axial extent 232 for which initial angel wing 250 was originally sized.

As stated, in FIG. 5, angel wing 222 is formed by addition of material to initial angel wing 250. As shown in FIG. 5, axially extending tip 228 includes a foundational tip 252 having an initial axial extent 254, and an attached material section 256 extending initial axial extent 254 of foundational tip 252, i.e., to a new, larger axial extent 248. Attached material section 256 may include a block of material in the form of: a metal block, a metal coating and/or a ceramic coating. In one embodiment, attached material section 256 may be added to an upper surface 210 of angel wing 250 adjacent foundational tip 252. However, it is understood that material section 256 may be attached anywhere necessary to extend foundational tip 252, e.g., by adding material to foundational tip 252 on a side opposite surface 210. In any event, material section 256 may be attached using any now known or later developed technology appropriate for the material used, e.g., welding, brazing, coating, etc., and with any necessary refining required, e.g., machining, polishing, etc. The material used may be the same as initial angel wing 250, or may be different. In one embodiment, attached material section 256 may be removable, e.g., by machining or otherwise detaching. The ability to remove material section 256 may be advantageous, for example, where the desired axial extent for axially extending tip 228 is the same as foundational tip 252. In one embodiment, axially extending tip 228 has substantially identical radial height R (axis of rotation not shown) as foundational tip 252 without attached material section 256, i.e., prior to the attaching of attached material section 256.

Turbomachine bucket 120 (FIG. 4) including angel wing 222 may be used as is or further modified (see discussion of FIG. 6). In any event, axially extending tip 228 has an axial extent 248 that accommodates sealing with one or more discourager(s) 234 having a discourager axial extent(s) 236 different than discourager axial extent 232 of first, initial discourager 230. In this fashion, after the modifying of FIG. 5, turbomachine bucket 120 (FIG. 4) employing angel wing 222 may be installed in a turbomachine frame 132 (FIG. 4) having a discourager 234 having a discourager axial extent 236 larger than the original, designed for, discourager axial extent 232, i.e., such that angel wing 222 operatively seals with discourager 234 during operation of the turbomachine. The installation of bucket 120 may employ any now known or later developed process. It is understood that material section 256 may be added to have axially extending tip 228 accommodate a particular sized discourager 234 or a number of different sized discouragers 234. Each of the plurality of discouragers 234 may be in a different turbomachine such that turbomachine bucket 120 employing angel wing 222 may be employed in different sized turbomachines.

Turning to FIG. 6, an angel wing 322 may be modified by removal of material 360 (in phantom) from an initial angel wing 350. The material removal may include any now known or later developed technique appropriate for the material being used, e.g., machining metal, etc. Angel wing 322 may result from an initial angel wing 350 that is created, e.g., cast, to accommodate a number of different sized discouragers 330, 334. More particularly, an axial extent 354 of initial, axially extending tip 352 of angel wing 350, which is sized to accommodate sealing with a number of different sized discouragers, may have material removed to accommodate a particular discourager 334 having a particular axial extent 336. Alternatively, initial angel wing 350 may be on a turbomachine bucket (removed from a turbomachine) that has sufficient material thereon to allow for removal of some material of angel wing 350 and installation in another, different sized turbomachine. In any event, discourager axial extent 336 is typically larger than initial discourager axial extent 332, but not necessarily, depending on relative locations of bucket 120 (FIG. 4) and turbomachine frame 132 (FIG. 4). Turbomachine bucket 120 (FIG. 4) employing angel wing 322 may be installed in a turbomachine frame 132 (FIG. 4) having a particular discourager 334 having a particular axial extent 336 such that angel wing 322 is configured to seal with discourager 334 during operation of the turbomachine. As with FIG. 5, axially extending tip 328 may have a substantially identical radial height R as initial, axially extending tip 352 prior to the removing of material.

Figure 7:
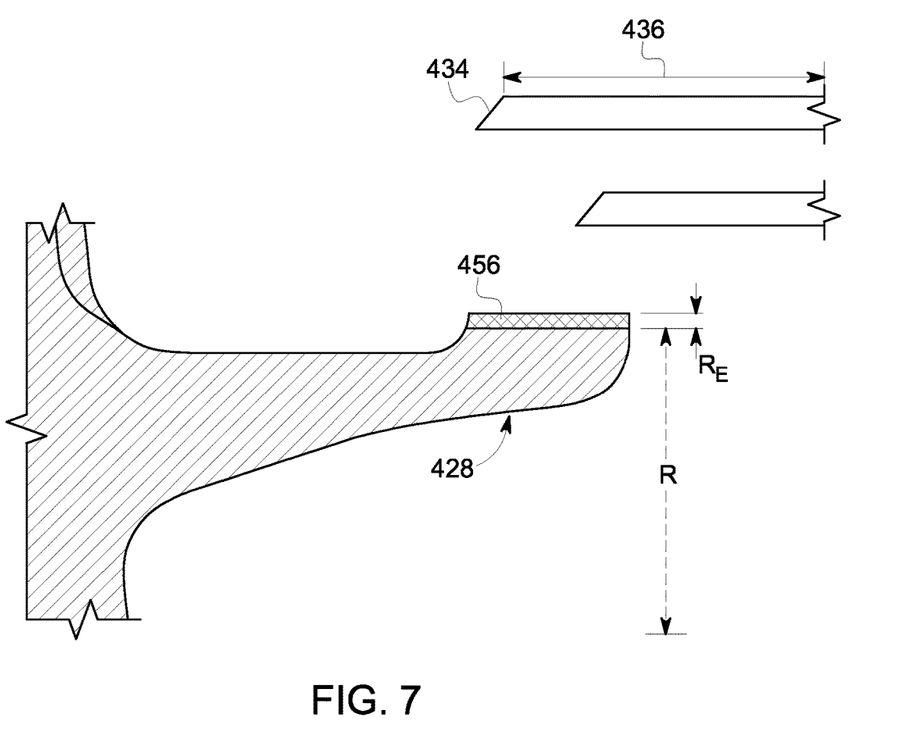
FIG. 7 shows a detailed cross-sectional view of an angel wing according to an optional embodiment of the invention.

Referring to FIG. 7, in an optional embodiment, the modifying may further include changing a radial extent $R_E$ of an axially extending tip 428 to configure the axially extending tip to seal with a second discourager 434 having a second axial extent 436. Radial extent $R_E$ may be changed by adding material 456, as described herein, or removing material 456 from axially extending tip 428 as described herein. The change in radial extent $R_E$ may also occur without the aforementioned axial extent modifications, where appropriate.

The provision of a turbomachine bucket 120 with an angel wing as described herein and/or the modification of an angel wing designed for a particular machine as described herein provides a number of advantages. For example, a modified turbomachine bucket 120 having added material section 256 allows backwards compatibility of a particular turbomachine bucket with a newer model or different sized turbomachine, thus extending the life of the bucket and improving performance over an installation without the modification. Further, the process adds flexibility, reduces scrap created during a system upgrade (e.g., buckets that must be discarded because they no longer fit) and provides improved performance over the use of poor fitting buckets. Furthermore, the provision of a turbomachine bucket capable of use in a number of different sized turbomachines as described may reduce the need for: numerous castings, casting changes to accommodate different turbomachine sizes, need to determine casting volumes, and the need to predetermine which angel wings need to be a particular size prior to casting.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbomachine bucket comprising:
   an airfoil;
   a shank coupled to the airfoil; and
   an angel wing, the angel wing having a base portion, a body portion, and an axially extending tip, the angel wing coupled to the shank by the base portion, the body portion connecting the base portion with the axially extending tip, the axially extending tip having a foundation tip, a sealing surface, and an attached material section, the axially extending tip sized to seal with a plurality of discouragers, each discourager having a different axial extent,
   the foundation tip and the sealing surface having an initial axial extent,
   the axially extending tip being parallel to an axis of rotation of the turbomachine bucket, the attached material section extending the initial axial extent of the foundation tip and the sealing surface.

2. The turbomachine bucket of claim 1, wherein the axially extending tip has substantially identical radial height as the foundational tip without the attached material section, the substantially identical radial height being perpendicular to the axially extending tip.

3. The turbomachine bucket of claim 1, wherein the attached material section is removable.

4. The turbomachine bucket of claim 1, wherein the attached material section includes a block of material in the form of one of: a metal block, a metal coating, or a ceramic coating.

5. The turbomachine bucket of claim 1, wherein the axially extending tip is configured to seal with the discourager extending from one of a nozzle and a diaphragm of a turbomachine frame.

6. The turbomachine bucket of claim 1, wherein each of the plurality of discouragers are in a different turbomachine.

7. A method of modifying an angel wing of a turbomachine bucket, the method comprising:
   providing the angel wing, the angel wing having a base portion, a body portion, and an axially extending tip, the body portion connecting the base portion with the axially extending tip, the axially extending tip having a foundation and a sealing surface, the foundation and the sealing surface having an axial extent,
   the axial extent and the axially extending tip extending in a direction of an axis of rotation of the turbomachine bucket relative to a shank of the turbomachine bucket when the angel wing is attached to the shank;
   modifying the axial extent of the axially extending tip of the angel wing to accommodate sealing with a plurality of discouragers having different axial extents,
   the modifying including attaching a material section to the axially extending tip to extend the axial extent of the foundation and the sealing surface.

8. The method of claim 7, wherein the axially extending tip after the attaching has substantially identical radial height as the axially extending tip prior to the attaching, the radial height extending in a direction perpendicular to the axis of rotation of the turbomachine bucket.

9. The method of claim 7, wherein the attaching the material section includes refining the axially extending tip.

10. The method of claim 7, wherein the attached material section is removable.

11. The method of claim 7, wherein the attached material section includes a block of material in the form of one of: a metal block, a metal coating, or a ceramic coating.

12. The method of claim 7, further comprising:
   removing the turbomachine bucket from a first turbomachine frame prior to the modifying, the first turbomachine frame including a first discourager having a first axial extent for which the angel wing was originally sized.

13. The method of claim 12, further comprising:
   after the modifying, installing the turbomachine bucket in a second turbomachine frame having a second discourager having a second axial extent different than the first axial extent, the modified angel wing configured to seal with the second discourager during operation of the second turbomachine.

14. The method of claim 7, further comprising:
   installing the turbomachine bucket in a turbomachine having a discourager having a discourager axial extent different than a discourager axial extent for which the angel wing was sized prior to the modifying, the modified angel wing configured to seal with the discourager during operation of the turbomachine.

15. A method of modifying an angel wing of a turbomachine bucket, the method comprising:
   providing the turbomachine bucket having the angel wing having an axially extending tip having a first axial extent sized to seal with a plurality of discouragers, the plurality of discouragers having a discourager having a first discourager axial extent and a discourager having a second discourager axial extent;
   modifying the first axial extent of the axially extending tip of the angel wing to accommodate the discourager having the second discourager axial extent, wherein the second discourager axial extent is smaller than the first discourager axial extent; and
   removing a portion of the axially extending tip to accommodate the discourager having the second discourager axial extent,
   the axially extending tip being parallel to an axis of rotation of the turbomachine bucket.

16. The method of claim 15, wherein the axially extending tip has substantially identical radial height as the axially extending tip prior to the removing, the substantially identical radial height being perpendicular to the axially extending tip.

17. The method of claim 15, wherein the providing includes:
   removing the turbomachine bucket from a first turbomachine frame prior to the modifying, the first turbomachine frame including a discourager having the first axial extent for which the angel wing was originally sized.

18. The method of claim 15, further comprising:
   after the modifying, installing the turbomachine bucket in a turbomachine frame having the discourager having the second discourager axial extent, the angel wing configured to seal with the discourager having the second discourager axial extent during operation of the turbomachine.

19. A method of modifying an angel wing of a turbomachine bucket, the method comprising:
   removing the turbomachine bucket from a first turbomachine, the bucket having the angel wing sized to seal with a first discourager of the first turbomachine, the first discourager having a first discourager axial extent;

modifying an axial extent of an axially extending tip of the angel wing of the turbomachine bucket to configure sealing with a second discourager having a second axial discourager extent different than the first discourager axial extent; and installing the turbomachine bucket in a second turbomachine having the second discourager having the second discourager axial extent, the angel wing configured to seal with the second discourager having the second discourager axial extent during operation of the second turbomachine, the axially extending tip being parallel to an axis of rotation of the turbomachine bucket.

20. The method of claim 19, wherein the modifying includes:

attaching a material section to the axially extending tip of the angel wing that is sized to fit the first discourager having the first discourager axial extent such that the axially extending tip is configured to seal with the second discourager having the second discourager axial extent different than the first discourager axial extent.

21. The method of claim 19, wherein the modifying includes:

removing a portion of the axially extending tip to configure the axially extending tip to seal with the second discourager having the second discourager axial extent.

22. The method of claim 19, further comprising modifying a radial extent height of the axially extending tip to configure the axially extending tip to seal with the second discourager having the second discourager axial extent, the radial extent height being perpendicular to the axially extending tip.

* * * * *